June 1, 1965

C. S. BERTAS 3,186,092

OPTICAL DEVICE FOR READING GOLF GREENS

Filed Oct. 12, 1962

CHARLES S. BERTAS
*INVENTOR.*

BY *Bernard J. Brown*

ATTORNEY

3,186,092
OPTICAL DEVICE FOR READING GOLF GREENS
Charles S. Bertas, 16821 Benbow, Covina, Calif.
Filed Oct. 12, 1962, Ser. No. 230,057
3 Claims. (Cl. 33—64)

The present invention relates generally to an optical viewing device or instrument to enable golfers to read golf greens with improved accuracy; more particularly, the invention relates to an optical viewing device detachably secured to a golf club to enable a golfer to more accurately determine the slope or undulations in a golf green between a ball and a hole so that he can more accurately determine the direction in which to putt the ball in order to sink it in the hole.

Golf greens are ordinarily not truly flat, there generally being some slope or undulations in the green between the golf ball and the cup. As is well known to golfers, most putts cannot be made in a straight line. That is, the ball is not struck directly toward the cup or hole but must be stroked at an angle to compensate for deflection or "break" imparted by the slope or undulations of the green. Inaccurate judgment of the deflection or "break" results in missed putts. A golfer must by visual observation estimate or guess the deflection or "break" with which to stroke the ball. Such observation of the slope or undulations of the green is done without relation to a proper reference. Considering an illustrative situation, a green may have a gentle uniform transverse slope along the line between the ball and the hole or cup. This slope requires that the ball be putted not directly toward the cup, but at a slight angle toward the higher side of the green, in order that the deviation in the ball's path caused by the slope will be sufficient that the ball will follow a curved path into the cup. This small angle or deviation from a straight line between the cup and the ball is herein called the deflection or deflection angle. The problem is obviously compounded where the slope between the hole and cup is not uniform. Undulations or compound slopes require nice judgment by the golfer as to the particular deflection angle at which the ball must be putted and the force with which the ball is to be struck.

It is therefore necessary for a golfer to develop skill in observing or reading the green and to develop judgment and skill regarding the amount of deflection with which to stroke the ball.

The golf green viewing device of the present invention provides a reference which enables a golfer to more accurately determine the slope or undulations in a golf green between the ball and a hole, thereby permitting the more accurate determination of the deflection with which to putt the ball. The provision of a reference for the observation of the green inherently develops and improves the skill of the golfer. By continued use of the device, the golfer becomes more skilled in interpreting his observation or readings of the slope or undulations of greens, and in adjusting accordingly the deflection angles used in stroking balls. The golfer's accuracy in judging and estimating proper deflection angles and stroking forces therefore is considerably improved relatively rapidly.

A preferred embodiment of the golf green viewing device of the invention comprises a transparent member having a horizontal reference line. The device has clipped portions or members which adapt it for detachable mounting on the shaft of a golf club. The golf club is held in a vertical position behind the ball and the ground in the manner of a pendulum. By sighting through the transparent member with the horizontal reference line aligned with the cup, the golfer is able to accurately estimate the slope or undulations of the green with reference to the horizontal reference line. Observation and estimates can be made of the angular slopes or undulations of the green all along the path which the ball is to follow to the cup. The golfer is thus able to determine with relative accuracy the deflection angle with which the ball should be stroked or putted to compensate for the slopes or undulations of the green.

It is therefore an object of the present invention to provide a new and improved golf green viewing device to enable golfers to read golf greens with improved accuracy.

An object of this invention is the provision of an optical viewing device which is detachably securable to a golf club to enable a golfer to more accurately determine the slope or undulations in a golf green between a ball and a hole.

It is an object of the invention to provide a golf green viewing device which provides a horizontal reference line which enables a golfer to estimate the slopes or undulations of a green with improved accuracy to permit the golfer to determine with improved accuracy the angle of deflection with which to stroke the ball.

An object of this invention is the provision of a utilitarian golf green viewing device which is capable of substantially improving the skills of a golfer.

Other objects, features and advantages of the present invention will become apparent to those versed in the art from a consideration of the following description, the appended claims and the accompanying drawing, in which:

Figure 1:
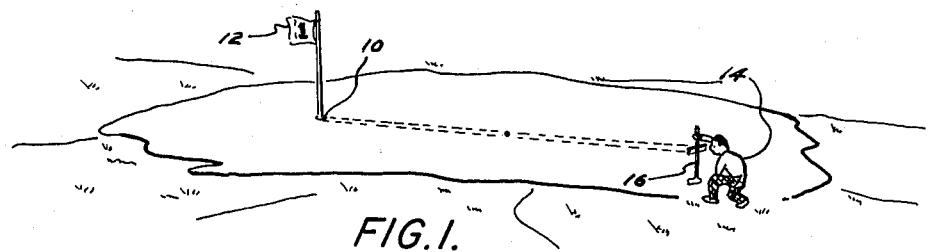
FIGURE 1 is a general perspective view of a golf green showing the utilization of the invention by a golfer.
Figure 2:
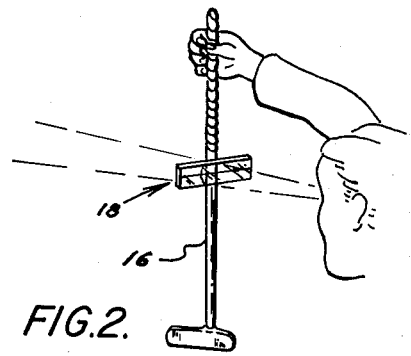
FIGURE 2 is an enlarged view of a portion of FIGURE 1, illustrating the use of the viewing device of the invention attached to a golf club.
Figure 3:
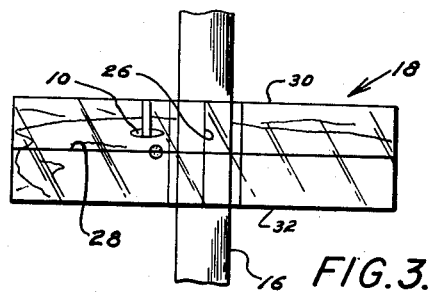
FIGURE 3 is an enlarged partial view showing the device of the invention in relation to a golf club to which it is attached, and further showing the golfer's view through the device during its utilization in the estimation of green slope or undulations.

Referring to the drawing, FIGURE 1 illustrates the utilization of a golf green viewing device of the invention. A green has a cup or hole 10 from which extends a flag pole 12 which carries a flag. A golfer 14 is shown holding a golf club 16 to which is attached a golf green viewing device 18 according to the invention. As shown, the viewing device is preferably attached to the shaft of the golf club below the grip. FIGURE 2, which is an enlargement of a portion of FIGURE 1, shows the club 16 being held by the golfer in a vertical position, in the general manner of a pendulum. The club being held in the manner shown in FIGURE 2, a typical view of the golfer sighting through the device is indicated in FIGURE 3.

Figure 4:
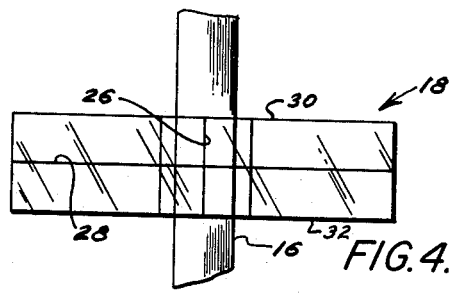
FIGURE 4 is a view, similar to the view of FIGURE 3, wherein the view through the device is omitted.
Figure 6:
FIGURE 6 is an end view of a golf green viewing device of FIGURES 4 and 5.
Figure 5:
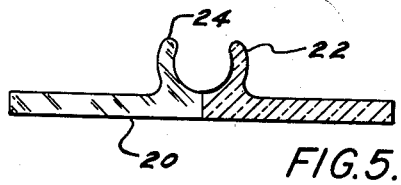
FIGURE 5 is a plan view, partially in section of the golf green viewing device of FIGURE 4.

A preferred embodiment of the viewing device 18 is shown in detail in FIGURES 4 through 6. The device is preferably in the form of a rectangular transparent plastic member 20. Integral extending resilient fingers or clip portions 22, 24 extend from the member 18, and have conforming inner arcuate surfaces, whereby the viewing device 18 may be resiliently and detachably secured to the shaft of the golf club 16. It will be appreciated that the viewing device 18 may be attached to the club by various other conventional means.

The viewing device 18 has a vertical index line or reference line 26 and a horizontal index line or reference line 28. The device is clipped or snapped onto the golf club shaft below the grip portion of the club, with the vertical index line 26 parallel to the shaft, as shown. With the club held vertically in the manner of a pendulum, as indicated in FIGURES 1 and 2, the reference line 28 is horizontal. Holding the club in this manner behind the golf ball, the golfer sites along the path between the hole or cup 10 and the golf ball. The golfer establishes an imaginary line between the ball and the cup.

The viewing device 18 has an upper edge 30 and a lower edge 32, each of which may serve as a horizontal reference line. Obviously, a plurality of lines may be defined on the device, instead of a single line. The term horizontal reference line herein refers to such a line however provided.

By observation of the green with reference to the horizontal reference line and the imaginary line between the ball and the cup, he is able to estimate or determine any slope or undulation of the green along the line between the ball and the cup. With such observations, the golfer is able to determine the amount of deflection or deflection angle required in putting the ball, in order to cause the ball to take an appropriate curved path to the cup. He is also able to estimate with relative accuracy the amount of force with which the ball must be stroked. The invention provides an accurate horizontal reference in a composite view with an imaginary line between the ball and the cup, thereby enabling the golfer to estimate and judge with relative accuracy the deflection and force to apply to a ball to compensate for the cumulative effect of the slopes or undulations.

From the foregoing, those versed in the art will appreciate that the present invention achieves the objects and realizes the advantages hereinbefore mentioned.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:
1. A golf green viewing device comprising a flat transparent member, resilient clip means in an intermediate position on said member and extending therefrom, whereby the transparent member may be attached to the shaft of a golf club to be disposed in a vertical plane while the golf club is held suspended in the manner of a pendulum, and an intermediate horizontal reference line defined in said member, whereby a green and hole are viewed by the golfer through the transparent member and whereby the reference line is aligned with the hole from a position at the ball so that the golfer can accurately read the green between a position at the ball and the hole.

2. A golf green viewing device comprising a flat transparent member, resilient clip means in an intermediate position on said member and extending therefrom, whereby the transparent member may be attached to the shaft of a golf club to be disposed in a vertical plane while the golf club is held suspended in the manner of a pendulum, said transparent member having parallel upper and lower edges, and a horizontal reference line midway between the upper and lower edges, the transparent member when in position on the golf club having portions extending to the right and left of the shaft in position for the golfer to sight through the member while the golf club is held suspended, whereby said reference line may be aligned by the golfer with the hole in the green from a position at the ball to enable the golfer to accurately read the slope of the green between the position of the ball and the hole in the green, said upper and lower edges of said transparent member also defining horizontal reference lines whereby the golfer can orient reading of the green with reference to the surroundings.

3. A golf green viewing device according to claim 2, wherein the transparent member is made of plastic and has vertical end edges.

References Cited by the Examiner

UNITED STATES PATENTS

| | | | |
|---|---|---|---|
| 2,723,125 | 11/55 | Comee | 33—46.05 |
| 2,796,666 | 6/57 | Liebowitz | 33—64 |
| 2,822,614 | 2/58 | Susinno | 33—46.05 |
| 2,986,937 | 6/61 | Chapman | 273—162 X |
| 3,033,574 | 5/62 | Partridge | 273—163 |

ISAAC LISANN, *Primary Examiner.*